United States Patent [19]

Fujiwara et al.

[11] Patent Number: 5,101,338
[45] Date of Patent: Mar. 31, 1992

[54] MEMORY ACCESS CONTROL DEVICE WHICH CAN BE FORMED BY A REDUCED NUMBER OF LSI'S

[75] Inventors: Yoshifumi Fujiwara, Tokyo; Toyoshi Kitamura, Yamanashi, both of Japan

[73] Assignee: NEC Corporation, Tokyo, Japan

[21] Appl. No.: 343,886

[22] Filed: Apr. 27, 1989

[30] Foreign Application Priority Data

Apr. 27, 1988 [JP] Japan .................. 63-105325

[51] Int. Cl.$^5$ .................. G06F 12/06; G11C 8/00
[52] U.S. Cl. .................. 395/400; 395/425
[58] Field of Search ... 364/200 MS File, 900 MS File

[56] References Cited

U.S. PATENT DOCUMENTS

| 4,128,880 | 12/1978 | Cray, Jr. | 364/200 |
|---|---|---|---|
| 4,661,900 | 4/1987 | Chen et al. | 364/200 |
| 4,706,191 | 11/1987 | Hamstra et al. | 364/200 |
| 4,839,801 | 6/1989 | Nicely et al. | 364/200 |
| 4,860,249 | 8/1989 | Nicely et al. | 364/200 |
| 4,888,679 | 12/1989 | Fossum et al. | 364/200 |
| 4,926,317 | 5/1990 | Wallach et al. | 364/200 |
| 4,945,479 | 7/1990 | Rusterholz et al. | 364/200 |

Primary Examiner—Joseph A. Popek
Assistant Examiner—Michael A. Whitfield
Attorney, Agent, or Firm—Foley & Lardner

[57] ABSTRACT

In an access control device (30) for use in combination with first through (2×m)-th memory units (m: 2, 3, ...) each of which is assigned with at least one of addresses consecutively numbered among the memory units, each of first through m-th arithmetic circuits products, in response to a base address B of the addresses and a preselected distance D, an arithmetic result (B+nD), where n represents one of first through m-th values which are equal to "0", "1", ..., and "m−1", respectively. A value distributing circuit (36) is preliminarily given the values and distributes the first through the m-th values in response to a distributing control signal. Responsive to the base address and to the preselected distance, a signal producing circuit (39) produces the distributing control signal. A result distributing circuit (43) distributes the arithmetic results of the first through the m-th arithmetic circuits to the first through the (2×m)-th memory units as selected ones of the addresses. The selected addresses are determined by selecting the base address in consideration of the preselected distance left between two adjacent ones of the selected addresses.

1 Claim, 10 Drawing Sheets

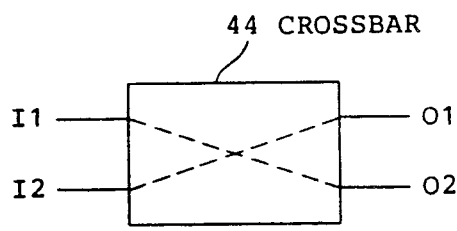
FIG.5
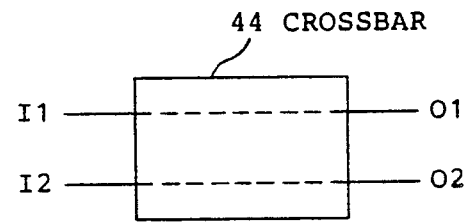
FIG.6
| CROSSBAR CONTROL SIGNAL | | | CROSSBAR OUTPUT | | | |
|---|---|---|---|---|---|---|
| 42-3 (bx1) | 42-1 (x1) | 42-2 (bx0) | 37-1 | 37-2 | 37-3 | 37-4 |
| "0" | — | "0" | "0" | | "2" | |
| "0" | — | "1" | | "0" | | "2" |
| "1" | — | "0" | "2" | | "0" | |
| "1" | — | "1" | | "2" | | "0" |
| — | "0" | "0" | | "1" | | "3" |
| — | "0" | "1" | "1" | | "3" | |
| — | "1" | "0" | | "3" | | "1" |
| — | "1" | "1" | "3" | | "1" | |
FIG.7

| FLAG OF 59 (63) | A1(2) (64-2) | A1(0) (64-1) | ENABLED SELECTOR |
|---|---|---|---|
| "0" | "0" | "0" | 54-1 |
| "0" | "0" | "1" | 54-2 |
| "0" | "1" | "0" | 54-3 |
| "0" | "1" | "1" | 54-4 |
| "1" | "0" | "X" | 54-1 & 54-2 |
| "1" | "1" | "X" | 54-3 & 54-4 |

FIG.10

| FLAG OF 59 (63) | A2(2) (64-4) | A2(0) (64-3) | ENABLED SELECTOR |
|---|---|---|---|
| "0" | "0" | "0" | 54-1 |
| "0" | "0" | "1" | 54-2 |
| "0" | "1" | "0" | 54-3 |
| "0" | "1" | "1" | 54-4 |
| "1" | "0" | "X" | 54-1 & 54-2 |
| "1" | "1" | "X" | 54-3 & 54-4 |

FIG.11

| FLAG OF 59 (63) | A3(2) (66-2) | A3(0) (66-1) | ENABLED SELECTOR |
|---|---|---|---|
| "0" | "0" | "0" | 54-5 |
| "0" | "0" | "1" | 54-6 |
| "0" | "1" | "0" | 54-7 |
| "0" | "1" | "1" | 54-8 |
| "1" | "0" | "X" | 54-5 & 54-6 |
| "1" | "1" | "X" | 54-7 & 54-8 |

FIG.13

| FLAG OF 59 (63) | A4(2) (66-4) | A4(0) (66-3) | ENABLED SELECTOR |
|---|---|---|---|
| "0" | "0" | "0" | 54-5 |
| "0" | "0" | "1" | 54-6 |
| "0" | "1" | "0" | 54-7 |
| "0" | "1" | "1" | 54-8 |
| "1" | "0" | "X" | 54-5 & 54-6 |
| "1" | "1" | "X" | 54-7 & 54-8 |

FIG.14

MEMORY ACCESS CONTROL DEVICE WHICH CAN BE FORMED BY A REDUCED NUMBER OF LSI'S

BACKGROUND OF THE INVENTION

This invention relates to a memory access control device for accessing a memory device to read and/or write a data block consisting of a plurality of data elements from and/or in the memory device. The memory access control device is used in a vector processing system or the like.

A memory access control device of the type described, is for use in combination with a memory device which comprises first through p-th memory units and first through p-th ports connected to the first through the p-th memory units, respectively, where p represents an integer greater than one. Each of the memory units is assigned with at least one of memory addresses consecutively increasing relative to the first through the p-th memory units in order to read and/or write each of the data elements of the data block from and/or in the memory device. The memory access control device is for accessing selected ones of the memory addresses by selecting a base address or reference address one of the memory addresses and a preselected distance between two adjacent ones of the selected ones of the memory addresses. That is, the base one of the memory addresses is identical with a leading one of the selected addresses.

As will later be described in conjunction with a figure of accompanying drawing, a conventional memory access control device comprises an access address producing circuit for simultaneously producing first through p-th access addresses when the preselected distance is a unit distance. That is, the number of the access addresses is equal to the number of the ports. Supposing that the base memory address is represented by B and that the preselected distance is represented by D, the access addresses are represented by (B), (B+D), B+2D), ..., and (B+nD), where n represents one of values equal to "0", "1", "2", ..., and "p−1".

Responsive to the first through the p-th access addresses, a crossbar circuit supplies the first through the p-th access addresses to corresponding ones of the memory units via the first through the p-th ports. As a result, the corresponding ones of the memory units are simultaneously accessed by the first through the p-th access addresses.

Attention will now be directed to a case where the crossbar circuit is implemented by the use of LSIs (large scale integrated circuits). The sum of input and output pins which can be formed on an LSI is restricted to a predetermined maximum value as known in the art. The number of the input and output pins which are necessary in forming the crossbar circuit by the use of the LSIs, increases in direct proportion to a total sum of the number of the ports and the number of the access addresses. Inasmuch as the access address producing circuit produces the access addresses equal in number to the ports, as mentioned above, the total sum of the number of the input and the output pins are twice the number of the output pins. Each of the access addresses is of, for example, thirty bits. In this event, the total sum of the number of the input and output pins enormously increases. In order to deal with such a problem related to a great number of pins, it is necessary to increase the number of LSIs merely for the purpose of coping with the number of the input and the output pins.

SUMMARY OF THE INVENTION

It is therefore an object of this invention to provide a memory access control device which can be formed by a reduced number of LSIs, even when a great number of input and output LSI pins are necessary.

Other objects of this invention will become clear as the description proceeds.

A memory access control device, for use in a vector processing system, in combination with a memory device comprising a plurality of memory units which are 2 m in number and are called first through 2m-th memory units by using consecutively increasing memory numbers, wherein m represents an integer which is greater than one, said first through said 2m-th memory units being connected to first through 2m-th memory ports being assigned at least one of a plurality of memory addresses which consecutively increase in correspondence to said consecutively increasing memory numbers, said memory access control device accessing selected ones of said memory addresses by selecting a base address from said memory addresses and by using a preselected distance between two adjacent ones of said selected ones of the memory addresses and including a base register for holding said base address as a held address and a distance register for holding said preselected distance as a held distance, comprising:

first through m-th arithmetic units, each of which is connected to said base address register and said distance register to calculate an arithmetic result given by a formula (B+nD), wherein B represents said held address, D represents said held distance, and n represents one of a first value 0 through an m-th value (m−1);

a control section connected to said base address register and said distance register for producing a distribution control signal dependent on said held address and said held distance;

a crossbar circuit having first through said m-th values and connected to said first through said m-th arithmetic units and said control section for distributing said first through said m-th values to said first through said m-th arithmetic units in response to said distribution control signal; and an arithmetic result distributing circuit connected to said first through said m-th arithmetic units and said first through said 2m-th ports for distributing the arithmetic results calculated by said first through said m-th arithmetic units to said first through said 2m-th ports as said selected ones of the memory addresses by changing n in said formula from said first value up to said m-th value and by changing B to (B+m) when n is changed up to said m-th value if said preselected ones of the memory addresses are greater than said m-th value and are not greater than twice said m-th value.

BRIEF DESCRIPTION OF THE DRAWING

FIG. 5 is a block diagram for use in describing operation of a crossbar of the crossbar circuit illustrated in FIG. 4;

FIG. 6 is another block diagram for use in describing another operation of a crossbar of the crossbar circuit illustrated in FIG. 4;

FIG. 7 is a diagram for use in describing the operation of the crossbar circuit illustrated in FIG. 4;

FIG. 10 is a diagram for use in describing the operation of the first control circuit illustrated in FIG. 9;

FIG. 11 is another diagram for use in describing another operation of the first control circuit illustrated in FIG. 9;

FIG. 13 is a diagram for use in describing operation of the second control circuit illustrated in FIG. 12; and FIG. 14 is another diagram for use in describing another operation of the second control circuit illustrated in FIG. 12.

DESCRIPTION OF THE PREFERRED EMBODIMENT

Figure 1:
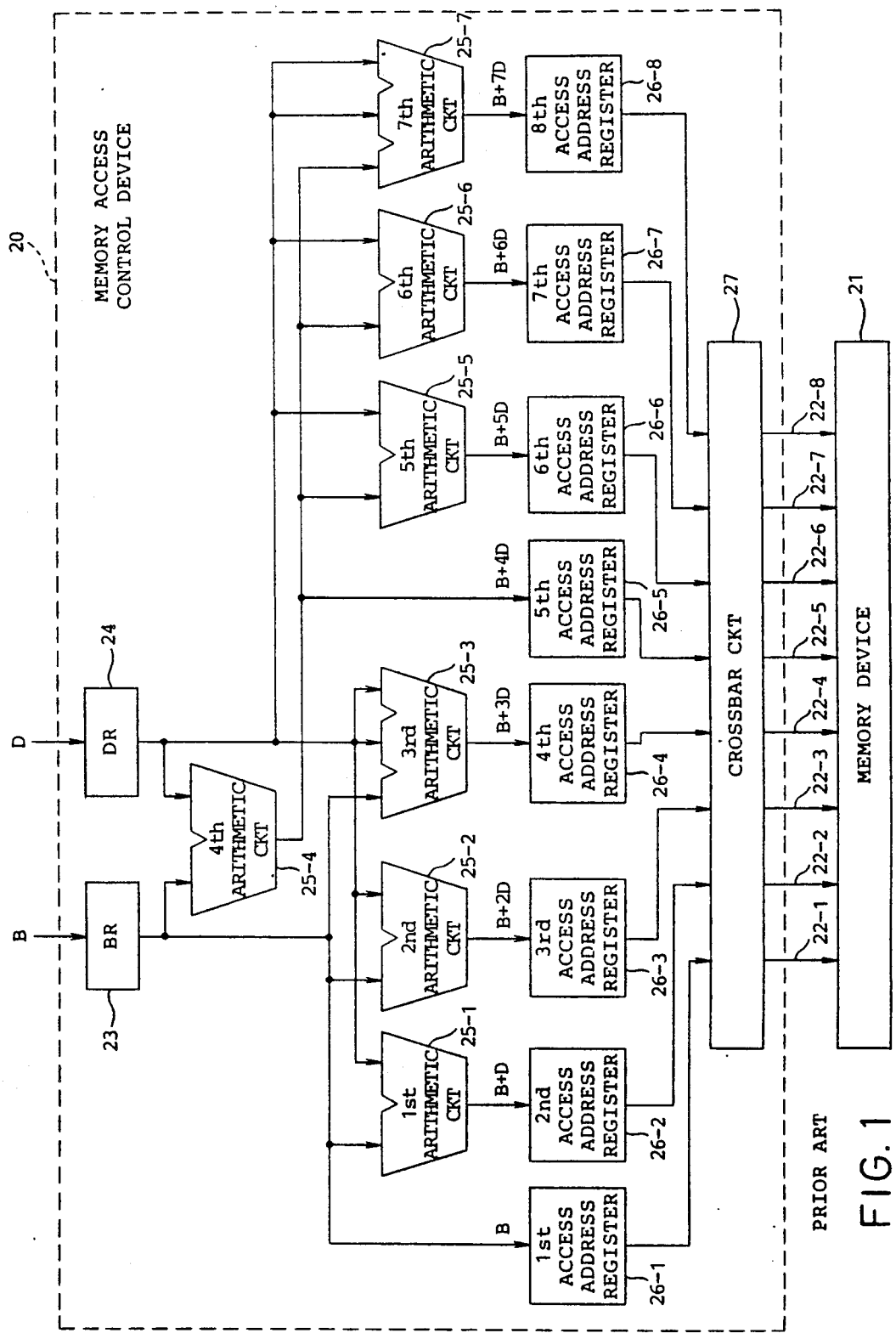
FIG. 1 is a block diagram of a conventional memory access control device connected to a memory device.

Referring to FIG. 1, a conventional memory access control device 20 will be described first, for a better understanding of this invention. The conventional memory access control device 20 is equivalent to a memory access control device which is described in the preamble of the instant specification.

As described in the preamble of the instant specification, the conventional memory access control device 20 is used in combination with a memory device 21 comprises first through p-th memory units (not shown) each of which is assigned at least one of memory addresses which consecutively increase in relation to the memory units. The memory device 21 further comprises first through p-th ports connected to the first through the p-th memory units, respectively. In the example being illustrated, the memory device 21 comprises first through eighth ports 22-1, ..., and 22.8. Therefore, the number of the memory units is equal to eight. The memory access control device 20 is for accessing selected ones of the memory addresses at a preselected distance D by selecting a base B of the memory addresses.

The memory access control device 20 comprises a base address register 23 for holding the base B of the memory addresses as a held base address B and a distance register 24 for holding the preselected distance D as a held distance D. The base address register 23 is labelled BR while the distance register 24 is labelled DR. The illustrated memory access control device 20 further comprises first through seventh arithmetic circuits 25-1, ..., and 25-7 and first through eighth access address registers 26-1, ..., and 26-8. The first access address register 26-1 is connected to the base address register 23 to hold the held base address B as a first access address.

Each of the first through the fourth arithmetic circuits 25-1, ..., and 25-4 is connected to the base address register 23 and the distance register 24. Responsive to the held base address B and the held distance D, the first through the fourth arithmetic circuits 25-1 to 25-4 produce first through fourth produced addresses (B+D), (B+2D), (B+3D), and (B+4D), respectively. Each of the fifth through the seventh arithmetic circuits 25-5 to 25-7 is connected to the fourth arithmetic circuit 25-4 and the distance register 24. Responsive to the fourth produced address (B+4D) and the held distance D, the fifth through the seventh arithmetic circuits 25-5 to 25-7 produce fifth through seventh produced addresses (B+5D), (B+6D), and (B+7D), respectively.

The second through eighth access address registers 26-2, ..., and 26-8 are connected to the first through the seventh arithmetic circuits 25-1 to 25-7, respectively. The first through the seventh produced addresses (B+D), (B+2D), (B+3D), (B+4D), (B+5D), (B+6D), and (B+7D) are held in the second through the eighth access registers 26-2 to 26-8 as second through eighth access addresses, respectively. Thus, a combination of the first through the seventh arithmetic circuits 25 (suffixes omitted) and the first through the eighth access address registers 26 (suffixes omitted) serves as an access address producing circuit described in the preamble of the instant specification.

A crossbar circuit 27 is connected to the first through the eighth access address registers 26 and the first through the eighth ports 22 (suffixes omitted) to supply each of the first through the eighth access addresses (B), (B+D), (B+2D), (B+3D), (B+4D), (B+5D), (B+6D), and (B+7) to one of the first through the eighth ports 22. This one of the first through the eighth ports 22 corresponds to one of the memory units that should be accessed by the access address under consideration.

When the crossbar circuit 27 is formed by the use of LSI's, the number of the LSI's should be increased merely for the purpose of coping with the number of input and output LSI pins as described in the preamble of the instant specification.

Figure 2:
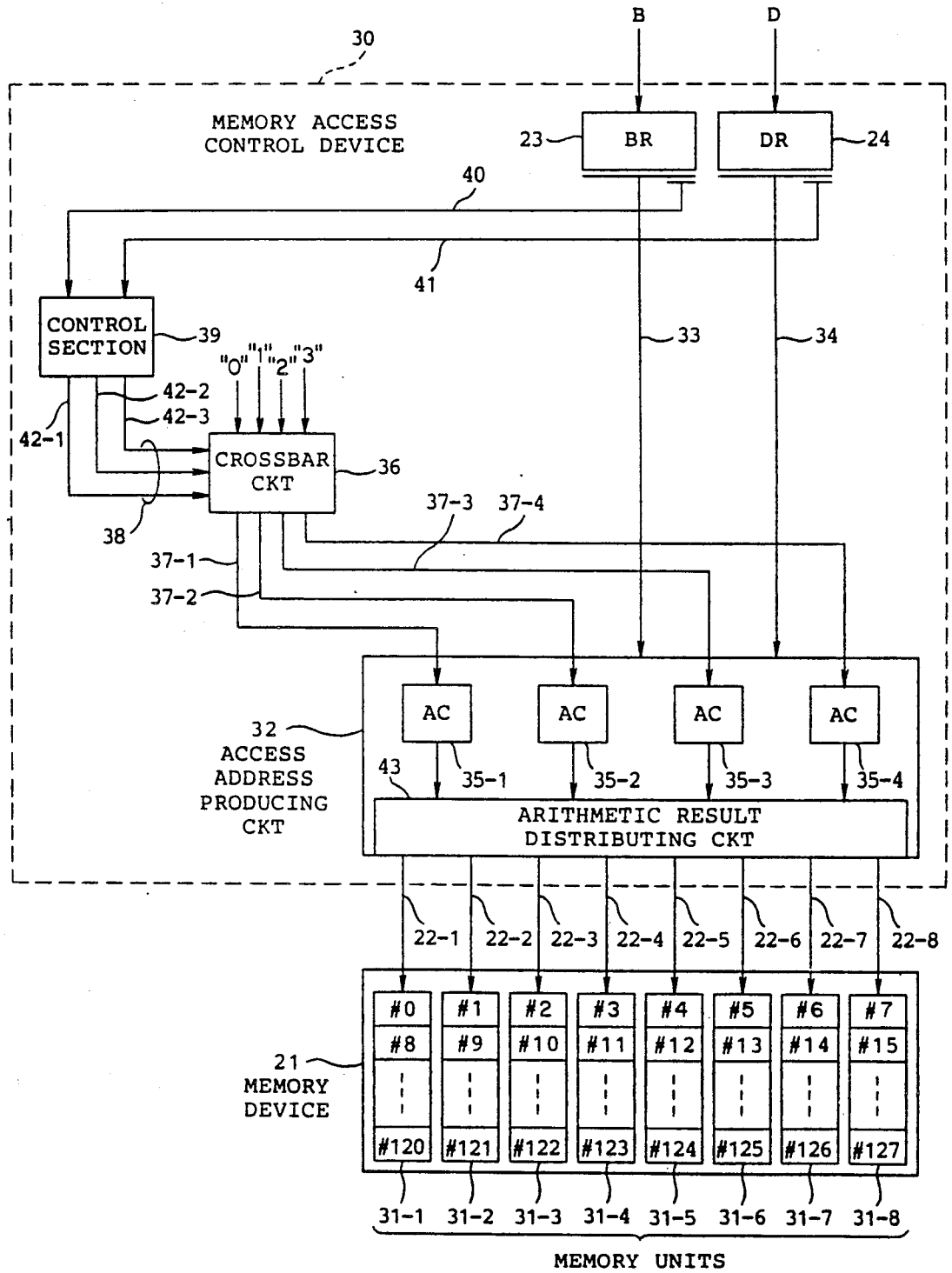
FIG. 2 is a block diagram illustrative of a memory access control device according to an embodiment of this invention, together with a memory device.

Referring to FIG. 2, a memory access control device 30 according to a preferred embodiment of this invention is also for use in combination with the memory device 21. The memory device 21 comprises first through q-th memory units and first through q-th ports connected to the first through the q-th memory units, respectively, where q is equal to (2×m) and where, in turn, m represents an integer greater than one. In the illustrated memory device 21, q and m are equal to eight and four, respectively. More specifically, the illustrated memory device 21 comprises first through eighth memory units 31-1, ..., and 31-8, connected to first through eighth ports 22-1 to 22-8, respectively. Each of the memory units 31 (suffixes omitted) is also called a memory module.

The memory device 21 comprises one hundred and twenty-eight banks. Each of the banks is assigned with one of memory addresses #0, #1, ..., and #127, The first memory unit 31-1 consists of sixteen banks of the memory addresses #0, #8, ..., and #120. The banks of the first memory unit 31-1 are connected in common to the first port 22-1. The second memory unit 31-2 consists of sixteen banks of the memory addresses #1, #9, ..., and #121. Likewise, the eighth memory unit 31-8 consists of banks of the memory addresses #7, #15, ..., and #127. Thus, each of the memory units 31 is assigned at least one of the memory addresses consecutively increasing relative to the first through eighth memory units 31-1 to 31-8.

Like the memory access control device 20 illustrated in FIG. 1, the memory access control device 30 is for accessing selected ones of the memory addresses by selecting a base memory address B among the memory addresses with a preselected distance D left between two adjacent ones of the selected one of the memory addresses. When the memory access control device 30 receives a memory access request signal from an external device (not shown), the base memory address B and the preselected distance D are held in the base address register 23 and the distance register 24 as the held base address B and the held distance D, respectively.

An access address producing circuit 32 is connected to the base address register 23 and the distance register 24 through connection lines 33 and 34. The access address producing circuit 32 comprises first through m-th arithmetic circuits. In the example being illustrated, the access address producing circuit 32 comprises first through fourth arithmetic circuits 35-1, ..., and 35-4, each of which is labelled AC.

As will later be illustrated, each of the arithmetic circuits 35 (suffixes omitted) is connected to the base address register 23 and the distance register 24. Responsive to the held base address B and the held distance D, each of the arithmetic circuits 35 produces an arithmetic result (B+nD), where n is representative of one of first through m-th values. The first through the m-th values are equal to "0", "1", ..., and "m−1", respectively. Inasmuch as m is equal to four in the illustrated memory access control device 30, n is representative of one of the first through fourth values which are equal to "0", "1", "2", and "3", respectively.

A crossbar circuit 36 is preliminarily given the first through the fourth values and is connected to the first through the fourth arithmetic circuits 35-1 to 35-4 via first through fourth connection lines 37-1, ..., and 37-4. In the manner which will readily be understood, the first through the m-th values correspond to m selected ones of the memory banks "0 to #127 when multiplied by the distance D. It is therefore possible to preliminarily give the first through the fourth values "0", "1", and "2", and "3" by using a keyboard or a like device which is indicated by four signal input lines labelled "0" to "3". The crossbar circuit 36 distributes the first through the fourth values to the first through fourth arithmetic circuits 35-1 to 35-4 in response to a distributing control signal (namely, a crossbar control signal) 38. From this viewpoint, the crossbar circuit 36 will be referred to as a value distributing circuit.

A control section 39 is connected to the base address register 23 and the distance register 24 through connection lines 40 and 41, and also to the crossbar circuit 36. Responsive to the held base address and the held distance, the control section 39 produces the distributing control signal 38. Therefore, the control section 39 will be called a distributing control signal producing circuit. The distributing control signal 38 comprises first through third partial control signals 42-1, ..., and 42-3, which will become clear as the description proceeds.

An arithmetic result distributing circuit 43 is connected to the first through fourth arithmetic circuits 35-1 to 35-4 and to the first through the eighth ports 22-1 to 22-8. The arithmetic result distributing circuit 43 distributes the arithmetic results of the first through the fourth arithmetic circuits 35-1 to 35-4 to the first through the eighth ports 22-1 to 22-8 as the selected ones of the memory addresses.

Figure 3:
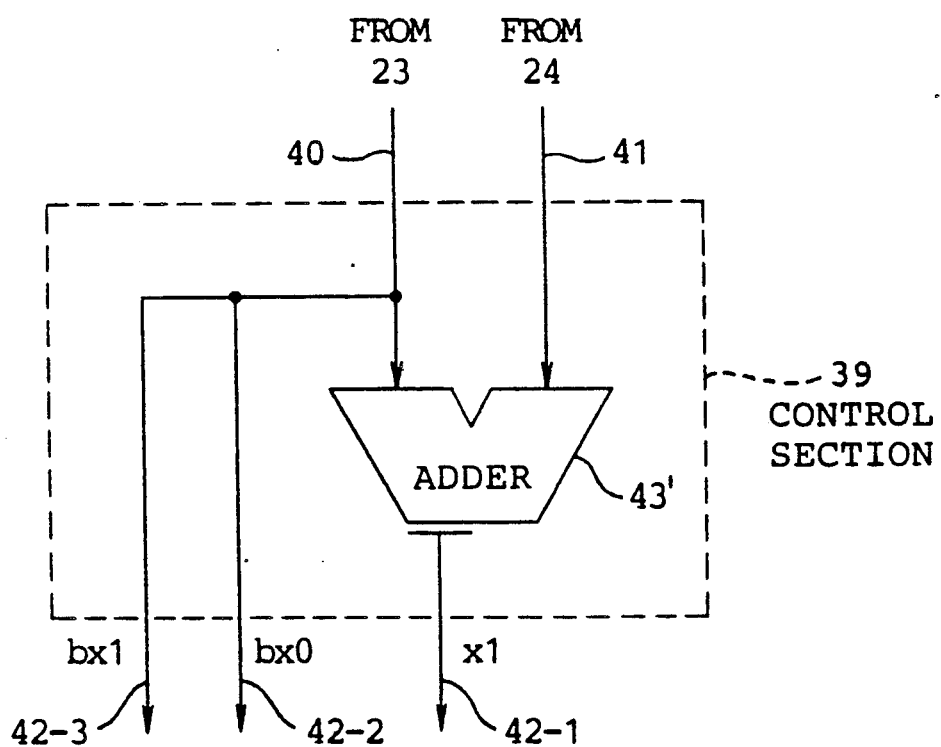
FIG. 3 is a block diagram of a control section of the memory access control device illustrated in FIG. 2.

Referring to FIG. 3, the control section 39 comprises an adder 43' connected through the connection lines 40 and 41 to the base address and the distance register 23 and 24 (FIG. 2). It will be assumed that, in the held base address B, a least significant bit (namely, a zeroth bit) and a first bit are represented by bx0 and bx1, respectively, when the held base address B is expressed by a binary representation. It will also be assumed that, in the held distance D, a least significant bit (namely, a zeroth bit) and a first bit are represented by dx0 and dx1, respectively, when the held distance D is expressed by a binary representation. The first bit is the last significant bit less one.

Further supposing that a combination of the zeroth and the first bits bx0 and bx1 of the held base address B is represented by BX and that another combination of the zeroth and the first bits dx0 and dx1 of the held distance D is represented by DX, the adder 43' receives the combinations BS and DX from the connection lines 40 and 41 and produces an addition result represented by (BX+DX). Still further supposing that a first bit, which is a least significant bit but one of the addition result (BX+DX), is represented by x1, the first bit x1 of the addition result (BX+DX) is delivered to the crossbar circuit 36 as the first partial control signal 42-1.

The zeroth bit bx0 of the held base address B is delivered to the crossbar circuit 36 as the second partial control signal 42-2. The first bit bx1 of the held base address B is delivered to the crossbar circuit 36 as the third partial control signal 42-3.

Figure 4:
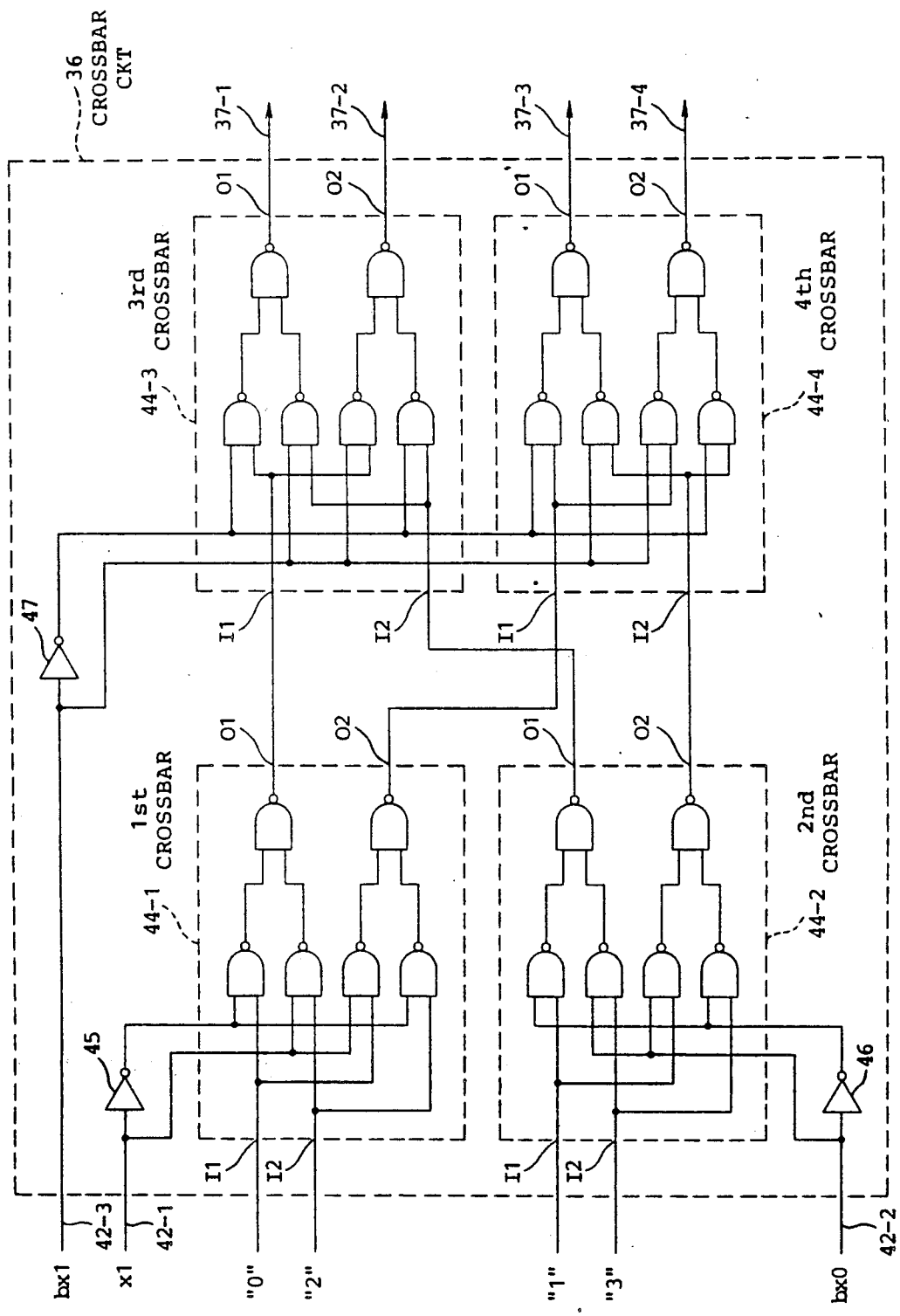
FIG. 4 is a block diagram of a crossbar circuit of the memory access control device illustrated in FIG. 2.

Turning to FIG. 4, the crossbar circuit 36 comprises first through fourth crossbars 44-1, ..., and 44-4. The first crossbar 44-1 has first and second input terminals I1 and I2 and first and second output terminals O1 and O2. The first and second input terminals I1 and I2 of the first crossbar 44-1 are preliminarily given the first and the third values "0" and "2", respectively. The first crossbar 44-1 receives the first partial control signal 42-1 and a first inverted signal, into which the first partial control signal 42-1 is inverted by a first inverter 45. As mentioned above, the first partial control signal 42-1 is indicative of the first bit x1 of the addition result (BX+DX) of the adder 43' (FIG. 3). The first crossbar 44-1 comprises six NAND gates (unnumbered) to distribute the first and the third values "0" and "2" to the first and the second output terminals O1 and O2 thereof in response to the first partial control signal 42-1 and the first inverted signal.

The second crossbar 44-2 is similar to the first crossbar 44-1, except that first and second input terminals I1 and I2 of the second crossbar 44-2 are preliminarily given the second and the fourth values "1" and "3", respectively, and that the second crossbar 44-2 receives the second partial control signal 42-2 and a second inverted signal, into which the second partial control signal 42-2 is inverted by a second inverter 46. The second crossbar 44-2 distributes the second and the fourth values "1" and "3" to first and second output terminals O1 and O2 thereof in response to the second partial control signal 42-2 and the second inverted signal. The second partial control signal 42-1 is indicative of the zeroth bit bx0 of the held base address B.

The third crossbar 44-3 is also similar to the first crossbar 44-1 except that first and second input terminals I1 and I2 of the third crossbar 44-3 are connected to the first output terminals O1 of the first and of the second crossbars 44-1 and 44-2, respectively, and that the third crossbar 44-3 receives the third partial control signal 42-3 and a third inverted signal, into which the third partial control signal 42-3 is inverted by a third inverter 47. The third partial control signal 42-3 is indicative of the first bit bx1 of the held base address B. The third crossbar 44-3 has first and second output terminals O1 and O2 connected to the first and the second arithmetic circuits 35-1 and 35-2 (FIG. 2) through the first and the second connection lines 37-1 and 37-2, respectively.

The fourth crossbar 44-4 is similar to the third crossbar 44-3 except that first and second input terminals I1 and I2 of the fourth crossbar 44-4 are connected to the second output terminals O2 of the first and of the second crossbars 44-1 and 44-2, respectively. The fourth crossbar 44-4 has first and second output terminals O1 and O2 connected to the third and the fourth arithmetic circuits 35-3 and 35-4 (FIG. 2) through the third and the fourth connection lines 37-3 and 37-4, respectively.

Turning to FIG. 5, the description will proceed to operation of each of the first through fourth crossbars 44 (suffixes omitted) when the crossbar 44 under consideration receives the partial control signal 42 (FIG. 5, suffixes omitted) which has a logic "1" level. In this event, the crossbar 44 connects the first and the second input terminals I1 and I2 to the second and the first output terminals O2 and O1, respectively, as shown by crossing dashed lines. In other words, the crossbar 44 connects crosswise the first and the second input terminals I1 and I2 and the first and the second output terminals O1 and O2.

Turning to FIG. 6, the description will proceed to operation of each of the crossbars 44 when the crossbar 44 under consideration receives the partial control signal 42 which has a logic "0" level. In this event, the crossbar 44 connects the first and the second input terminals I1 and I2 to the first and the second output terminals O1 and O2, respectively, as shown by parallel dashed lines. In other words, the first crossbar 44 connects straight the first and the second input terminals I1 and I2 and the first and the second output terminals O1 and O2.

As a result, the crossbar circuit 36 illustrated in FIG. 4 distributes the first through the fourth values "0", "1", "2", and "3" to the first through the fourth connection lines 37-1 to 37-4 in accordance with the first through the third partial control signals 42-1 to 42-4 in the manner illustrated in FIG. 7.

Figure 8:
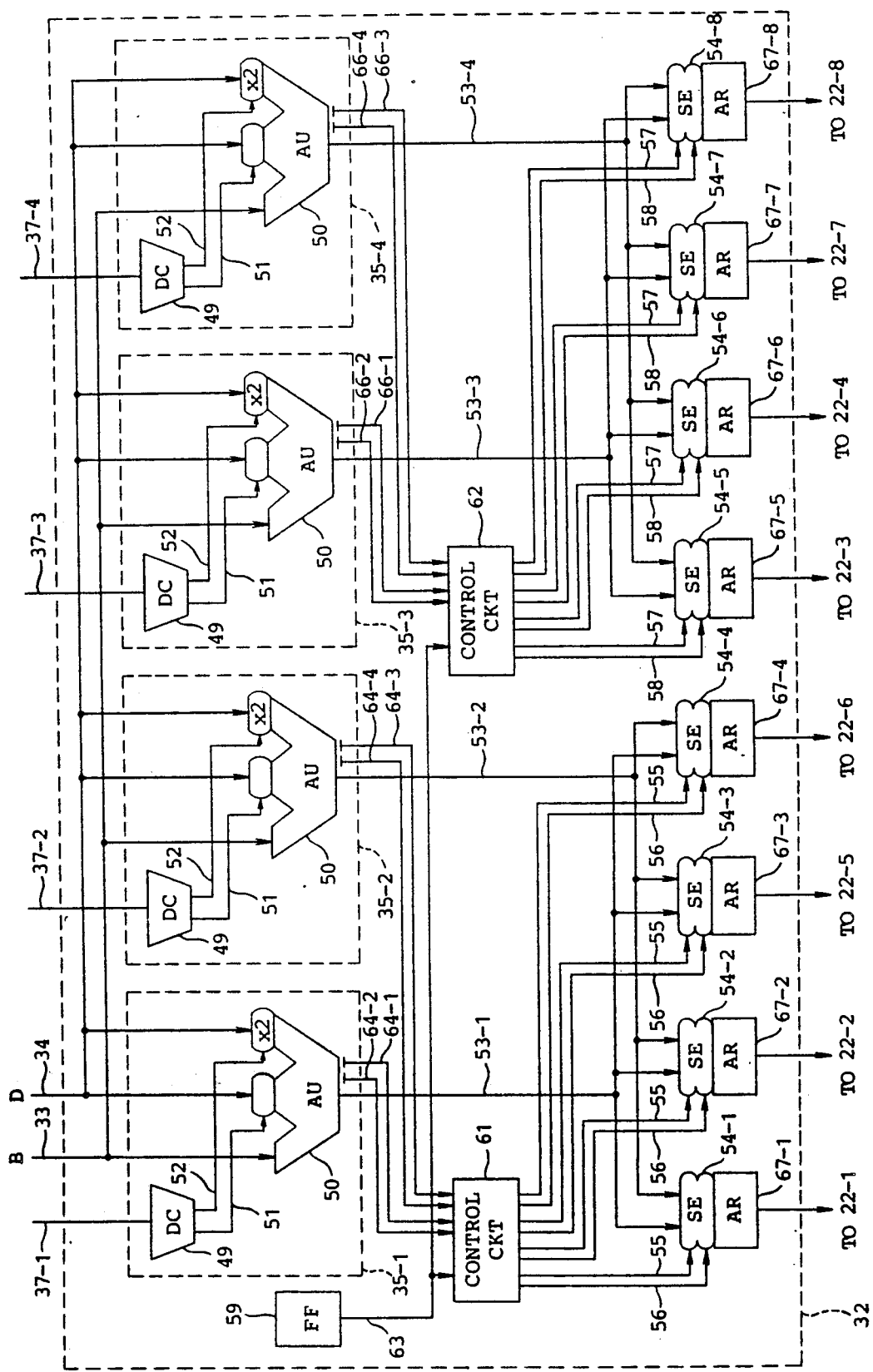
FIG. 8 is a block diagram of an access address producing circuit of the memory access control device illustrated in FIG. 2.

Referring to FIG. 8, the description will proceed to the access address producing circuit 32. As described above in conjunction with FIG. 2, the access address producing circuit 32 comprises first through fourth arithmetic circuits 35-1 to 35-4.

Attention will be directed to the first arithmetic circuit 35-1. The first arithmetic circuit 35-1 comprises a decoder 49 which is labelled DC and which is connected to the first connection line 37-1. As arithmetic unit 50, labelled AU, is connected to the decoder 49 through first and second signal lines 51 and 52 and to the registers 23 and 24 (FIG. 2) through the connection lines 33 and 34 through which the held base address B and the held distance D are supplied, respectively.

The decoder 49 receives one of the first through the fourth values "0", "1", "2", and "3" through the first connection line 37-1 and decodes that one of the values into a decoded signal consisting of first and second bit signals. When the decoder 49 receives the first value "0", the first and the second bit signals of the decoded signal have a logic "0" level in common. The second value "1" is decoded into the first and the second bit signals which have a logic "1" level and a logic "0" level, respectively. Likewise, the third value "2" is decoded into the first and the second bit signals which have a logic "0" level and a logic "1" level, respectively. When the fourth value "3" is received, the first and the second bit signals have a logic "1" level in common.

The first and the second bit signals are supplied to the first and the second signal lines 51 and 52, respectively. The first bit signal of a logic "1" level will be referred to as a first enable signal while the second bit signal of a logic "1" level will be called a second enable signal.

When the arithmetic unit 50 receives neither the first enable signal nor the second enable signal, the held base address B is delivered to a first output line 53-1 of the first arithmetic circuit 35-1 as the arithmetic result of the first arithmetic circuit 35-1. When the arithmetic unit 50 receives only the first enable signal among the first and the second enable signals, the arithmetic unit 50 adds the held base address B and the held distance D together and produces an addition result (B+D) which is supplied to the first output line 53-1 as the arithmetic result. Upon reception of only the second enable signal among the first and the second enable signals, the arithmetic unit 50 adds the held base address B and twice the held distance D together and produces another addition result (B+2D) which is supplied to the first output line 53-1 as the arithmetic result. When the first and the second enable signals are received, the arithmetic unit 50 adds the held base address B, the held distance D, and twice the held distance D together and produces still another addition result (B+3D) which is supplied to the first output line 53-1 as the arithmetic result.

Like the first arithmetic circuit 35-1, each of the second through the fourth arithmetic circuits 35-2 to 35-4 comprises a decoder 49 and an arithmetic unit 50 (the same reference numerals 49 and 50 being used). Each of the second through the fourth arithmetic circuits 35-2 to 35-4 is similar to the first arithmetic circuit 35-1 except that the decoders 49 of the second through the fourth arithmetic circuits 35-2 to 35-4 are connected to the second through the fourth connection lines 37-2 to 37-4, respectively, and that the arithmetic results produced by the arithmetic units 50 of the second through the fourth arithmetic circuits 35-2 to 35-4 are supplied to second through the fourth output lines 53-2, ..., and 53-4 of the second through the fourth arithmetic circuits 35-2 to 35-4, respectively.

The first through eighth selectors 54-1, ..., and 54-8 are labelled SE in common. A first selector group is composed of the first through the fourth selectors 54-1 to 54-4, while a second selector group is composed of the fifth through the eighth selectors 54-5 to 54-8. Each of the first through the fourth selectors 54-1 to 54-4 is connected to the first and the second output lines 53-1 and 53-2 of the first and the second arithmetic circuits 35-1 and 35-2, while each of the fifth through the eighth selectors 54-5 to 54-8 is connected to the third and the fourth output lines 53-3 and 53-4 of the third and the fourth arithmetic circuits 35-3 and 35-4.

When each of the first through the fourth selectors 54-1 to 54-4 is supplied with a selector enable signal 55, the selector in question selects, as a selected result, one of the arithmetic results received from the first and the second output lines 53-1 and 53-2 of the first and the second arithmetic circuits 35-1 and 35-2. The selected result of the selector under consideration is decided by an indication signal 56 indicative of one of the first and the second output lines 53-1 and 53-2 of the first and the second arithmetic circuits 35-1 and 35-2.

Likewise, each of the fifth through the eighth selectors 54-5 to 54-8 selects, as another selected result, one of the arithmetic results received from the third and the fourth output lines 53-3 and 53-4 of the third and the fourth arithmetic circuits 35-3 and 35-4 in response to another selector enable signal 57 and another indication signal 58. The other indication signal 58 is indicative of one of the third and the fourth output lines 53-3 and 53-4 of the third and the fourth arithmetic circuits 35-3 and 35-4.

Flip-flop circuit 59 is labelled FF. It will be assumed that each bank of the memory device 21 (FIG. 2) is capable of memorizing a data element of one word. A flag of logic "0" level is set in the flip-flop circuit 59 by an instruction controller (not shown) in a first case where the memory access control device 30 (FIG. 2) accesses the memory device 21 in order to read or write each data element of one word from or in each of the banks of the selected ones of the memory addresses. The first case is therefore called in the art a single word access mode. Another flag of logic "1" level is set in the flip-flop circuit 59 in a second case where the memory access control device 30 accesses the memory device 21 in order to read or write each data element of two words from or in the memory device 21. The second case is therefore called a double word access mode in the art.

Each of first and second control circuits 61 and 62 is connected to the flip-flop circuit 59 through a connection line 63. Attention will be directed to the first control circuit 61. The first control circuit 61 is also connected to the arithmetic unit 50 of the first arithmetic circuit 35-1 through first and second connection lines 64-1 and 64-2. The first control circuit 61 is still further connected to the arithmetic unit 50 of the second arithmetic circuit 35-2 through third and fourth connection lines 64-3 and 64-4.

It will be assumed that, in the arithmetic result of the arithmetic unit 50 of the first arithmetic circuit 35-1, a least significantly bit (namely, a zeroth bit) and a second bit are represented by A1(0) and A1(2), respectively, and that, in the arithmetic result of the arithmetic unit 50 of the second arithmetic circuit 35-2, a least significant bit (namely, a zeroth bit) and a second bit are represented by A2(0) and A2(2), respectively. It should be noted that the second bit A1(2) or A2(2) is the least significant bit but two.

The first control circuit 61 is supplied with the zeroth and the second bits A1(0) and A1(2) of the arithmetic result of the first arithmetic circuit 35-1 through the first and the second connection lines 64-1 and 64-2. The first control circuit 61 is also supplied with the zeroth and the second bits A2(0) and A2(2) of the arithmetic result of the second arithmetic circuit 35-2 through the third and the fourth connection lines 64-3 and 64-4. In accordance with the zeroth and the second bits A1(0) and A1(2) and the zeroth and the second bits A2(0) and A2(2) and with the reference to the flag set into the flip-flop circuit 59, the first control circuit 61 produces a combination of the enable signal 55 and the indication signal 56 and selectively delivers the combination of the enable and the indication signals 55 and 56 to the first through the fourth selectors 54-1 to 54-4 in the manner which will become clear as the description proceeds.

Attention will be directed to the second control circuit 62. The second control circuit 62 is connected to the arithmetic unit 50 of the third arithmetic circuit 35-3 through first and second connection lines 66-1 and 66-2. The second control circuit 62 is furthermore connected to the arithmetic unit 50 of the fourth arithmetic circuit 35-4 through third and fourth connection lines 66-3 and 66-4.

It will be assumed that, in the arithmetic result of the arithmetic unit 50 of the third arithmetic circuit 35-3, a least significant bit (namely, a zeroth bit) and a second bit are represented by A3(0) and A3(2), respectively, and that, in the arithmetic result of the arithmetic unit 50 of the fourth arithmetic circuit 35-4. A least significant bit (namely, a zeroth bit) and a second bit are represented by A4(0) and A4(2), respectively. The second bit is the least significant bit, less two.

The second control circuit 62 is supplied with the zeroth and the second bits A3(0) and A3(2) of the arithmetic result of the third arithmetic circuit 35-3 through the first and the second connection lines 66-1 and 66-2. The second control circuit 62 is also supplied with the zeroth and the second bits A4(0) and A4(2) of the arithmetic result of the fourth arithmetic circuit 35-4 through the third and the fourth connection lines 66-3 and 66-4. In accordance with the zeroth and the second bits A3(0) and A3(2) and the zeroth and the second bits A4(0) and A4(2) and with reference to the flag set in the flip-flop circuit 59, the second control circuit 62 produces a combination of the enable signal 57 and the indication signal 58 and selectively delivers the combination of the enable and the indication signals 57 and 58 to the fifth through the eighth selectors 54-5 to 54-8 in the manner, which will become clear as the description proceeds.

First through eighth access address registers 67-1, . . . , and 67-8 are labelled AR in common and are connected to the first through the eighth selectors 54-1 to 54-8, respectively. Each of the access address registers 67 (suffixes omitted) holds the selected result as an access address.

The first and the second access address registers 67-1 and 67-2 are connected to the first and the second ports 22-1 and 22-2, respectively. The third and the fourth access address registers 67-3 and 67-4 are connected to the fifth and the sixth ports 22-5 and 22-6, respectively. The fifth, the sixth, the seventh, and the eighth access address registers 67-5, 67-6, 67-7, and 67-8 are connected to the third, the fourth, the seventh, and the eighth ports 22-3, 22-4, 22-7, and 22-8, respectively.

The access addresses of the access address register 67 are supplied to the memory device 21 as the selected ones of the memory addresses through the ports 22. A combination of the first and the second control circuits 61 and 62, the selectors 54-1 to 54-8, and the access address registers 67-1 to 67-8 serves as the arithmetic result distributing circuit 43 described in conjunction with FIG. 2.

Figure 9:
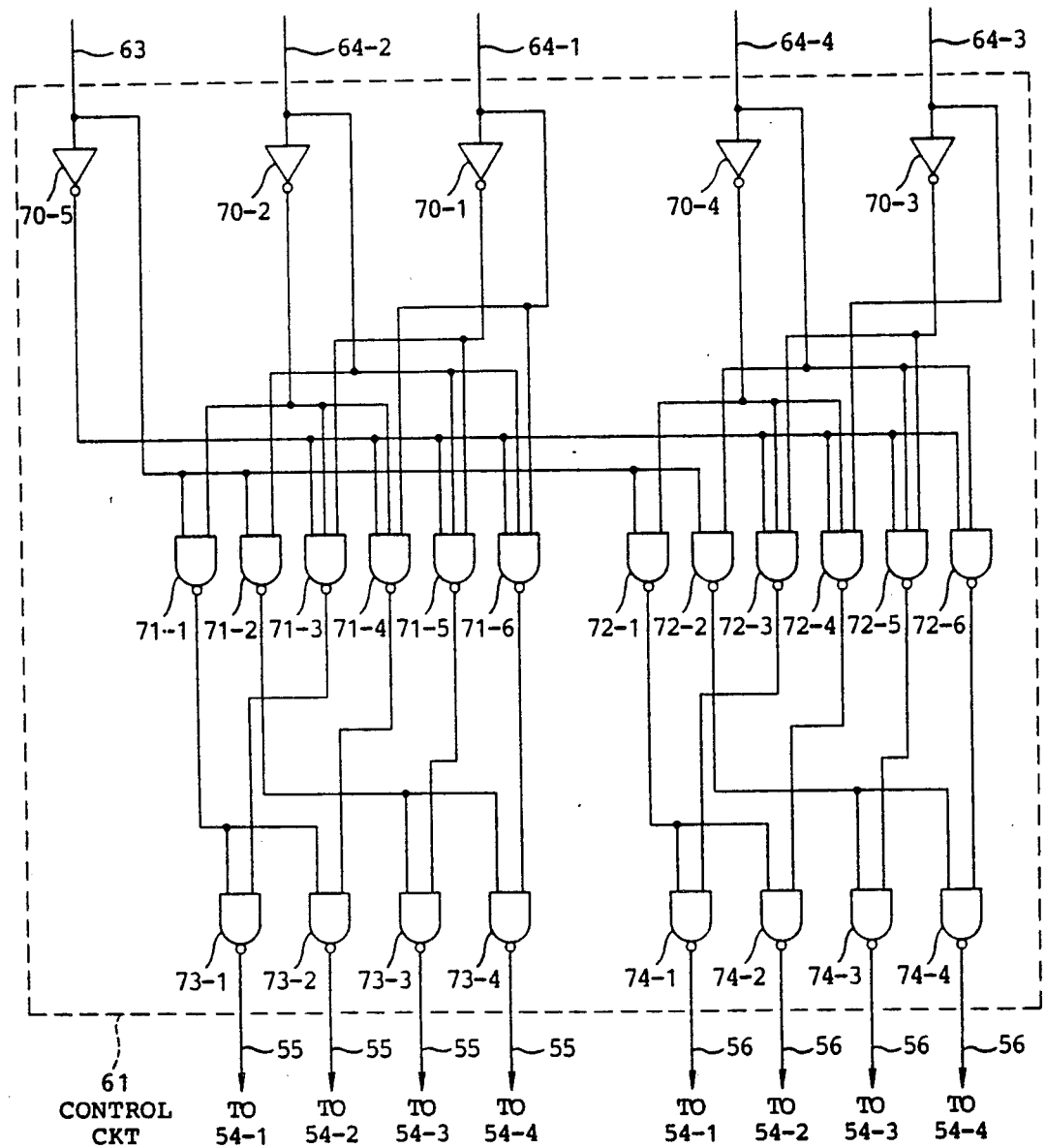
FIG. 9 is a block diagram of a first control circuit of the access address producing circuit illustrated in FIG. 8.

Turning to FIG. 9, the first control circuit 61 comprises first through fifth inverters 70-1, . . . , and 70-5. The first through fourth inverters 70-1 to 704 are connected to the first through the fourth connection lines 64-1 to 64-4, respectively. The fifth inverter 70-5 is connected to the connection line 63.

In the manner illustrated, a first combination of first through sixth NAND gates 71-1, . . . , and 71-6 is connected to the first, the second, and the fifth inverters 70-1, 70-2, and 70-5 and to the connection lines 64-1, 64-2, and 63. A second combination of first through sixth NAND gates 72-1, ..., and 72-6 is connected to the third, fourth, and the fifth inverters 70-3, 70-4, and 70-5 and to the connection lines 64-3, 64-4, and 63. A third combination of first through fourth NAND gates 73-1, ..., and 73-4 is connected to the first combination of the NAND gates 71-1 to 71-6. A fourth combination of first through fourth NAND gates 74-1, ..., and 74-4 is connected to the second combination of the NAND gates 72-1 to 72-6.

The NAND gates 73-1 to 73-4 are connected to the first through the fourth selectors 54-1 to 54-4, respectively, to deliver the selector enable signals 55 to the first through the fourth selectors 54-1 to 54-4, respectively. The NAND gates 74-1 to 74-4 are connected to the first through the fourth selectors 54-1 to 54-4, respectively, to deliver the indication signals 56 to the first through the fourth selectors 54-1 to 54-4, respectively.

Turning back to FIG. 8, the arithmetic result of the first arithmetic circuit 35-1 is selected by one or two enabled selectors of the selectors 54-1 to 54-4 under the control of the first control circuit 61 to deliver the arithmetic result of the first arithmetic circuit 35-1 to the memory device 21. The enabled selector is one of the selectors 54-1 to 54-4 that is enabled by the selector enable signal 55 produced by the first control circuit 61. Conditioned by the flag set in the flip-flop circuit 59 and the zeroth and the second bits A1(0) and A1(2) of the arithmetic result of the first arithmetic circuit 35-1, the first control circuit 61 makes the selectors 54-1 to 54-4 deliver the arithmetic result of the first arithmetic circuit 35-1 to the memory device 21 as shown in FIG. 10. In FIG. 10, "X" represents either "0" or "1".

For the arithmetic result of the second arithmetic circuit 35-2, conditions are shown in FIG. 11 under which the arithmetic result of the second arithmetic circuit 35-2 is delivered to the memory device 21.

Figure 12:
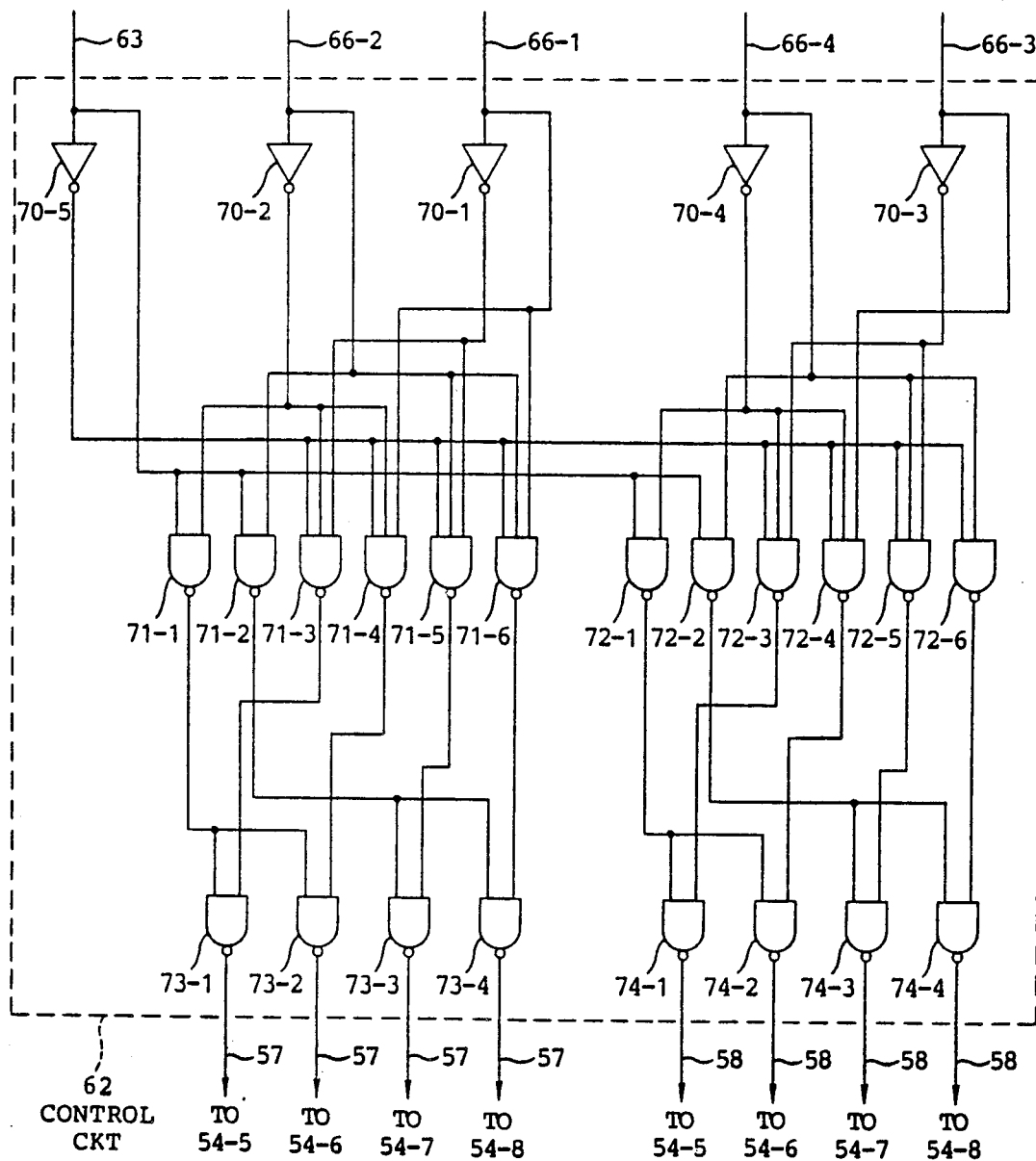
FIG. 12 is a block diagram of a second control circuit of the access address producing circuit illustrated in FIG. 8.

Turning to FIG. 12, the second control circuit 62 is similar to the first control circuit 61 except for the following. In the second control circuit 62, first through fourth inverters 70-1 to 70-4 are connected to the first through the fourth connection lines 66-1 to 66-4, respectively. A first combination of first through sixth NAND gates 71-1 to 71-6 is connected to the connection lines 66-1 and 66-2. A second combination of first through sixth NAND gates 72-1 to 72-6 is connected to the connection lines 66-3 and 66-4.

NAND gates 73-1 to 73-4 are connected to the fifth through the eighth selectors 54-5 to 54-8, respectively, to deliver the selector enable signals 57 to the fifth through the eighth selectors 54-5 to 54-8, respectively. NAND gates 74-1 to 74-4 are connected to the fifth through the eighth selectors 54-5 to 54-8, respectively, to deliver the indication signals 58 to the fifth through the eighth selectors 54-5 to 54-8, respectively.

Turning back to FIG. 8, the arithmetic result of the third arithmetic circuit 35-3 is selected by one or two enabled selectors of the selectors 54-5 to 54-8 under the control of the second control circuit 62, to deliver the arithmetic result of the third arithmetic circuit 35-3 to the memory unit 21. The enabled selector is one of the selectors 54-5 to 54-8 that is enabled by the selector enable signal 57 produced by the second control circuit 62. Conditioned by the flag set in the flip-flop circuit 59 and the zeroth and the second bits A3(0) and A3(2) of the arithmetic result of the third arithmetic circuit 35-3, the first control circuit 62 makes the selectors 54-5 to 54-8 deliver the arithmetic result of the third arithmetic circuit 35-3 to the memory device 21 as shown in FIG. 13.

For the arithmetic result of the fourth arithmetic circuit 35-4, conditions are shown in FIG. 14 under which the arithmetic result of the fourth arithmetic circuit 35-4 is delivered to the memory device 21.

Referring to FIG. 2, the description will proceed to operation of the memory access control device 30 when the base memory address "2" and the preselected distance "1" (namely, a unit distance) are held in the base address register 23 and the distance register 24 as the held base address and the held distance, respectively. The base memory address "2" and the preselected distance "1" are supplied from the afore-described external device which is controlled on supplying the base B to the base address register 23 and the preselected distance D to the distance register 24, in the manner described in conjunction with FIG. 2. The held base address is expressed by a binary representation of "10" while the held distance is expressed by a binary representation of 01". Therefore, the first and the zeroth bits bx1 and bx0 of the held base address are equal to "1" and "0", respectively. The first and the zeroth bits dx1 and dx0 of the held distance are equal to "0" and "1", respectively. A combination BX of the first and the zeroth bits bx1 and bx0 and another combination DX of the first and the zeroth bits dx1 and dx0 are supplied to the control section 39.

Referring to FIGS. 2 and 3, the adder 43' of the control section 39 receives the combinations BX and DX and produces an addition result (BX+DX) which is expressed by a binary representation of "11". Therefore, the first bit x1 of the addition result is equal to "1" and is delivered to the crossbar circuit 36 as the first partial control signal 42-1. The control section 39 delivers the zeroth bit bx0, equal to "0", to the crossbar circuit 36 as the second partial control signal 42-2. Simultaneously, the control section 39 delivers the first bit bx1, equal to "1", to the crossbar circuit 36 as the third partial control signal 42-3.

Referring to FIGS. 4 and 7, on reception of the first through the third partial control signals 42-1 to 42-3 which have "1", "0", and "1", respectively, the crossbar circuit 36 operates so that the values "2", "3", "0", and "1" are delivered to the first through the fourth connection lines 37-1 to 37-4, respectively.

Referring to FIGS. 2 and 8, description will proceed to the access address producing circuit 32. Attention will be directed to the first arithmetic circuit 35-1. Inasmuch as the decoder 49 is supplied with the value "2" through the first connection line 37-1, the decoder 49 delivers only the second enable signal to the arithmetic unit 50 through the second signal line 52. Upon reception of only the second enable signal among the first and the second enable signals, the arithmetic unit 50 adds the held base address B, equal to "2", and twice the held distance D, equal to "1", together and produces a first addition result "4" which is supplied to the first output line 53-1. The zeroth and the second bits A1(0) and A1(2) of the first addition result "4" are equal to "0" and "1", respectively, and are supplied to the first and the second connection lines 64-1 and 64-2, respectively.

Attention will be directed to the second arithmetic circuit 35-2. Inasmuch as the decoder 49 is supplied with the value "3" through the second connection line 37-2, the arithmetic unit 50 receives the first and the second enable signals through the first and the second signal lines 51 and 52. In this event, the arithmetic unit 50 adds the held base address B, equal to "2", the held distance D, equal to "1", and twice the held distance "1" together and produces a second addition result "5" which is supplied to the second output line 53-2. The zeroth and the second bits A2(0) and A2(2) of the second addition result "5" are equal to "1" and "1", respectively, and are supplied to the third and the fourth connection lines 64-3 and 64-4, respectively.

Inasmuch as the third arithmetic circuit 35-3 is supplied with the value "0" through the third connection line 37-3, the third arithmetic circuit 35-3 produces a third addition result "2", equal to the held base address B, to supply the third addition result to the third output line 53-3. The zeroth and the second bits A3(0) and A3(2) of the third addition result "2" are equal to "0" and "0", respectively, and are supplied to the first and the second connection lines 66-1 and 66-2, respectively.

Supplied with the value "1" through the fourth connection line 37-4, the fourth arithmetic circuit 35-4 adds the held base address B, equal to "2", and the held distance D, equal to "1", together and produces a fourth addition result "3" which is supplied to the fourth output line 53-4. The zeroth and the second bits A4(0) and A4(2) of the fourth addition result "3" are equal to "1" and "0", respectively, and are supplied to the third and the fourth connection lines 66-3 and 66-4, respectively.

Referring to FIGS. 8, 9, 10 and 11, the description will proceed to the first control circuit 61. It will be assumed that a flag of logic "0" level is set in the flip-flop circuit 59. That is, the memory access control device 30 (FIG. 2) is put into the single word access mode described before. Responsive to the zeroth bit A1(0), equal to "0", and the second bit A1(2), equal to "1", and with reference to the flag "0", the first control circuit 61 controls the selectors 54-1 to 54-4 so that the first addition result "4" of the first output line 53-1 is selected by the third selector 54-3. As a result, the first addition result "4" is delivered through the fifth port 22-5 to the fifth memory unit 31-5 (FIG. 2) having the bank of the memory address #4.

Responsive to the zeroth bit A2(0), equal to "1", and the second bit A2(2), equal to "1", and with reference to the flag "0", the first control circuit 61 also controls the selectors 54-1 to 54-4 so that the second addition result "5" of the second output line 53-2 is selected by the fourth selector 54-4. Therefore, the second addition result "5" is delivered through the sixth port 22-6 to the sixth memory unit 31-6 (FIG. 2) having the bank of the memory address #5.

Referring to FIGS. 8, 12, 13 and 14, the description will proceed to the second control circuit 62. Responsive to the zeroth bit A3(0), equal to "0", and the second bit A3(2), equal to "0", and with reference to the flag "0", the second control circuit 62 controls the selectors 54-5 to 54-8 so that the third addition result "2" of the third output line 53-3 is selected by the fifth selector 54-5. As a result, the third addition result "2" is delivered through the third port 22-3 to the third memory unit 31-3 (FIG. 2) having the bank of the memory address #2.

Responsive to the zeroth bit A4(0), equal to "1", and the second bit A4(2), equal to "0", and with reference to the flag "0", the second control circuit 62 also controls the selectors 54-5 to 54-8 so that the fourth addition result "3" of the fourth output line 53-4 is selected by the sixth selector 54-6. As a result, the fourth addition result "3" is delivered through the fourth port 22-4 to the fourth memory unit 31-4 (FIG. 2) having the bank of the memory address #3.

Thus, the memory access control device 30 illustrated in FIG. 2 can access the memory addresses #4, #5, #2, and #3 of the memory device 21 for a particular machine cycle. For a next machine cycle which follows the particular machine cycle, a base memory address "6" is newly held in the base address register 23 by the instruction controller with the unit distance "1" held in the distance register 24. The base memory address "6" is supplied from the external device or from the aforementioned instruction controller by manually or otherwise putting such a device into the operation of calculating a sum of the base memory address "2" used during the particular machine cycle and a number "m" or "4" which is predetermined by the number (2×m) of the memory units 31-1 to 31-8.

In the meantime, the preselected distance D or "1" is left untouched until the afore-mentioned data elements are read from the memory units 21 accessed by the selected memory addresses #2 through #5, #6 through #9, and others which are selected first by a combination of the base memory address "2" and the preselected distance "1" and subsequently by another combination of a newly-held base address (B+m) or "6" and the preselected distance D or "1". Such data elements are for use in, for example, vector processing when the memory access control device is used in the vector processing system exemplified heretobefore. In this case, the first through the fourth arithmetic circuits 35-1 to 35-4 produce first through fourth arithmetic results "8", "9", "6", and "7", respectively. By the arithmetic result distributing circuit 43, the first through the fourth arithmetic results "8", "9", "6", and "7" are distributed to the first, the second, the seventh, and the eighth memory units 31-1, 31-2, 31-7, and 31-8 which have the banks of the memory addresses #8, #9, #6, and #7, respectively.

What is claimed is:

1. A memory access control device for use in a vector processing system in combination with a memory device comprising a plurality of memory units which are 2m in number and are called first through 2m-th memory units by using consecutively increasing memory numbers, where m represents an integer which is greater than one, said first through said 2m-th memory units being connected to first through 2m-th memory ports being assigned at least one of a plurality of memory addresses which consecutively increase in correspondence to said consecutively increasing memory numbers, said memory access control device accessing selected ones of said memory addresses by selecting a base address from said memory addresses and by using a preselected distance between two adjacent ones of said selected ones of the memory addresses and including a base register for holding said base address as a held address and a distance register for holding said preselected distance as a held distance, said memory access control device comprising:

first through m-th arithmetic units, each of which is connected to said base address register and said distance register to calculate an arithmetic result given by a formula (B+nD), where B represents said held address, D represents said held distance, and n represents one of a first value 0 through an m-th value (m−1);

a control section connected to said base address register and said distance register for producing a distribution control signal dependent on said held address and said held distance;

a crossbar circuit having first through said m-th values and connected to said first through said m-th arithmetic units and said control section for distributing said first through said m-th values to said first through said m-th arithmetic units in response to said distribution control signal; and an arithmetic result distributing circuit connected to said first through said m-th arithmetic units and said first through said 2m-th ports for distributing the arithmetic results calculated by said first through said m-th arithmetic units to said first through said 2m-th ports as said selected ones of the memory addresses by changing n in said formula from said first value up to said m-th value and by changing B to (B+m) when n is changed up to said m-th value if said preselected ones of the memory addresses are greater than said m-th value and are not greater than twice said m-th value.

* * * * *